(12) United States Patent
Merkh et al.

(10) Patent No.: US 8,572,254 B2
(45) Date of Patent: Oct. 29, 2013

(54) SYSTEMS AND METHODS FOR ESTABLISHING AND VALIDATING SECURE NETWORK SESSIONS

(75) Inventors: Thomas Merkh, Westmont, NJ (US); Anthony Tancredi, Pennsville, NJ (US); Terry S. Bienstock, Miami Beach, FL (US)

(73) Assignee: WorldExtend, LLC, Mount Laurel, NJ (US)

( * ) Notice: Subject to any disclaimer, the term of this patent is extended or adjusted under 35 U.S.C. 154(b) by 1187 days.

(21) Appl. No.: 11/525,550

(22) Filed: Sep. 22, 2006

(65) Prior Publication Data

US 2007/0180126 A1    Aug. 2, 2007

Related U.S. Application Data

(63) Continuation-in-part of application No. 11/495,049, filed on Jul. 28, 2006, which is a continuation-in-part of application No. 11/101,150, filed on Apr. 7, 2005.

(60) Provisional application No. 60/560,680, filed on Apr. 8, 2004, provisional application No. 60/719,487, filed on Sep. 22, 2005.

(51) Int. Cl.
    *G06F 15/16*    (2006.01)
(52) U.S. Cl.
    USPC .......................... 709/227; 713/150; 713/151
(58) Field of Classification Search
    USPC .................................. 709/227; 713/150, 151
    See application file for complete search history.

(56) References Cited

U.S. PATENT DOCUMENTS

| | | | | |
|---|---|---|---|---|
| 6,134,591 A * | 10/2000 | Nickles | | 709/229 |
| 6,223,223 B1 * | 4/2001 | Kumpf et al. | | 709/227 |
| 6,317,775 B1 * | 11/2001 | Coile et al. | | 709/201 |
| 6,470,389 B1 | 10/2002 | Chung | | 709/227 |
| 7,430,590 B1 * | 9/2008 | Rive et al. | | 709/220 |
| 2003/0014623 A1 * | 1/2003 | Freed et al. | | 713/150 |
| 2003/0188001 A1 * | 10/2003 | Eisenberg et al. | | 709/229 |
| 2003/0236985 A1 * | 12/2003 | Ruuth | | 713/173 |
| 2004/0064568 A1 | 4/2004 | Arora et al. | | |
| 2004/0088347 A1 * | 5/2004 | Yeager et al. | | 709/202 |
| 2005/0060534 A1 * | 3/2005 | Marvasti | | 713/151 |
| 2005/0107985 A1 | 5/2005 | Agrawal | | 702/186 |
| 2005/0138428 A1 * | 6/2005 | McAllen et al. | | 713/201 |

(Continued)

OTHER PUBLICATIONS

International Search Report for PCT Patent Application No. PCT/US2006/012319 dated Jan. 24, 2008.

(Continued)

*Primary Examiner* — Krista Zele
*Assistant Examiner* — James Forman
(74) *Attorney, Agent, or Firm* — Robert C. Kain, Jr.

(57) ABSTRACT

A method and system that employ a central server with an associated database and a Master Agent for establishing a TCP/IP connection between a client and an application server associated with a Remote Agent. The application server hosts one or more business software applications for the client, and the client accesses the one or more business software applications at the application server using the established TCP/IP session. Files created by the client using the one or more business software applications at the application server are maintained and backed-up periodically at the application server by a service provider on behalf of the client.

14 Claims, 1 Drawing Sheet

(56) References Cited

U.S. PATENT DOCUMENTS

2005/0204157 A1* 9/2005 Johnson ................ 713/200
2006/0075111 A1* 4/2006 Auryan et al. ............ 709/227
2006/0143301 A1   6/2006 Merkh et al.
2007/0027815 A1* 2/2007 Sobel et al. ................ 705/59
2008/0104262 A1* 5/2008 Katz et al. ................ 709/229

OTHER PUBLICATIONS

International Search Report for PCT Patent Application No. PCT/US2006/037098 dated Feb. 13, 2008.

International Search Report for PCT Patent Application No. PCT/US2006/034638 dated Mar. 28, 2008.

* cited by examiner

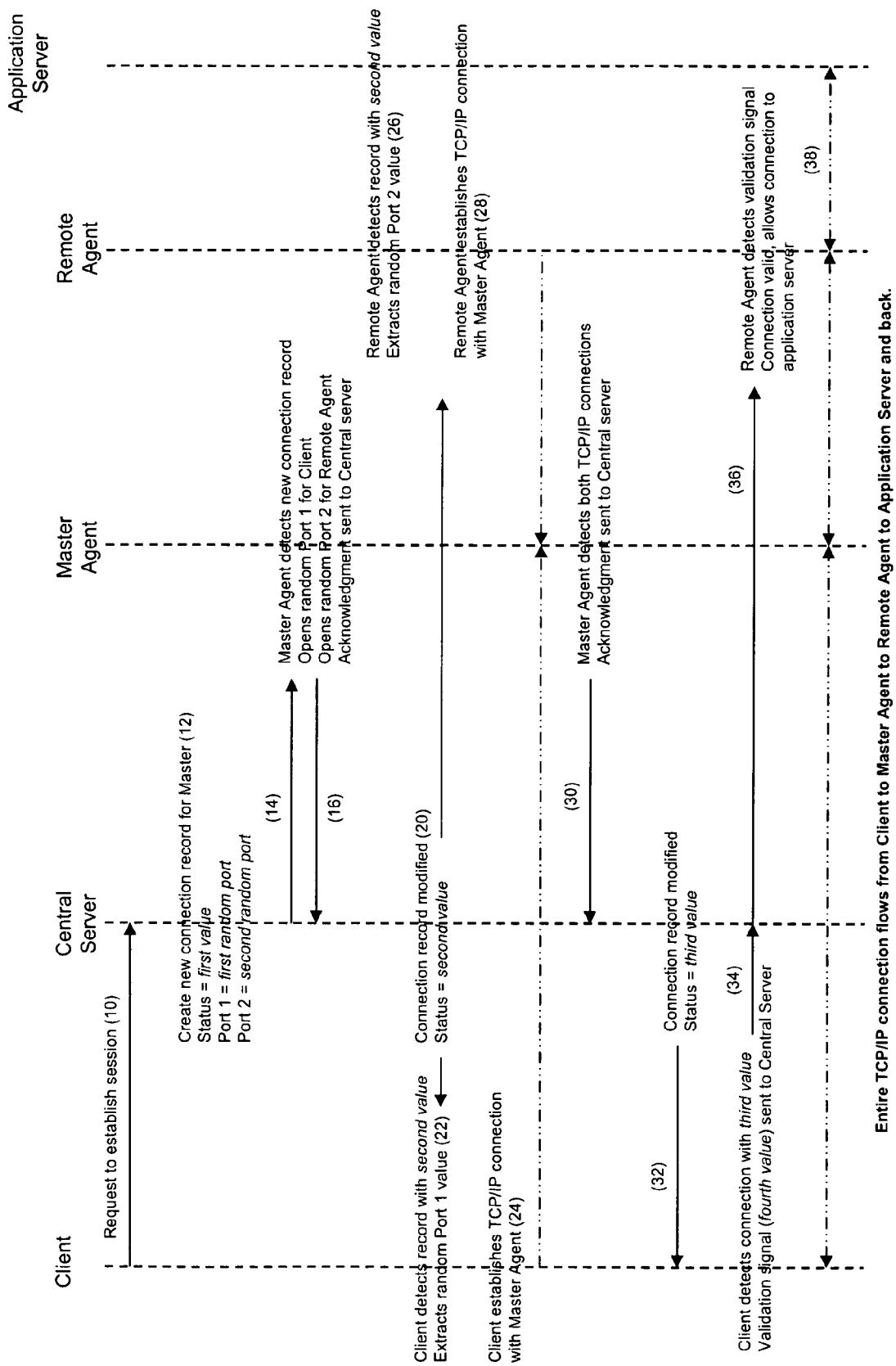

SYSTEMS AND METHODS FOR ESTABLISHING AND VALIDATING SECURE NETWORK SESSIONS

CROSS-REFERENCE TO RELATED APPLICATION

The present application is a continuation-in-part of U.S. patent application Ser. No. 11/495,049, filed Jul. 28, 2006, entitled "Systems and Methods for Establishing and Validating Secure Network Sessions," which is a continuation-in-part of U.S. patent application Ser. No. 11/101,150, filed Apr. 7, 2005, entitled "Systems and Methods for Establishing and Validating Secure Network Sessions," which claims priority based on U.S. Provisional Patent Application No. 60/560,680, filed Apr. 8, 2004, entitled "Methods for Establishing and Validating Sessions." The present application also claims priority to provisional patent application No. 60/719,487, filed Sep. 22, 2005, entitled "Network Computer Business Method Patent." The content of each of the above-referenced applications is incorporated herein in its entirety by reference.

FIELD OF THE INVENTION

The present application relates generally to systems and methods for establishing and validating secure network connections.

BACKGROUND OF THE INVENTION

Computer security is becoming increasingly important. The media is replete with stories of computer hackers breaking into computers, or viruses that attack and destroy information stored on computers. Many tools exist for enhancing computer security. For example, a security protocol known as Secure Sockets Layer (SSL) provides both privacy (e.g., secrecy) and authentication (e.g., confidence that a computer's and/or user's asserted identity is true) in the context of the world wide web. SSL technology is now built into many Internet browsers and web servers. The SSL protocol works by encrypting data passing between computers through use of encryption keys and associated encryption techniques. Despite the existence of SSL, additional solutions are required in order to meet the computer security needs of many organizations. The present invention provides such solutions.

In order to access typical business software applications (e.g., MS Word, Excel, or PowerPoint), a user is typically required to purchase a license for the software from the software owner, and install the software on the user's computer equipment. In addition, once the software is installed, the user is tasked with performing: (i) periodic data backups in order to ensure that data is recoverable in the event of a system failure; (ii) applications maintenance in order to ensure that updates and new versions are promptly installed on the user's equipment; and (iii) equipment installation/maintenance including, in some instances, internal network configuration. For many businesses, performance of these functions requires that costly IT personnel be on staff at the business. The present invention offers an alternative methodology which allows individuals and businesses to securely access business software applications that are hosted and maintained on a remote server by a service provider. The service provider performs functions currently performed by in-house IT staff at many businesses, including data backups and equipment/software maintenance.

SUMMARY OF THE INVENTION

The present application is directed to a method and system for establishing a TCP/IP connection between a client and an application server associated with a Remote Agent. A request to establish a session is sent from the client to a central server. In response to the request, the central server randomly selects at least first and second ports at a Master Agent from a list of available ports. A connection request record having a status field and port fields is created in a database at the central server. The status field is set to a first value, and the port fields are set to values corresponding to the randomly selected ports. The connection request record has a unique signature known to the Remote Agent. The Master Agent monitors the database for new connection request records having a status field set to the first value. Upon detection of the connection request record, the Master Agent opens the randomly selected port and sends the central server an acknowledgement that the randomly selected ports are open. Upon receipt of the acknowledgement at the central server, the central server sets the status field to a second value. In response to detection by the client that the status field is set to the second value, the client establishes a first TCP/IP connection between the client and the first randomly selected port. In response to detection by the Remote Agent that the status field is set to the second value, the Remote Agent establishes a second TCP/IP connection between the Remote Agent and Master Agent using the second randomly selected port. The Master Agent detects that the first and second TCP/IP connections are established on both random ports and then sends an acknowledgement indicating success to the central server. Upon receipt of the acknowledgement at the central server, the central server sets the status field to a third value. In response to detection by the client that the status field is set to the third value, the client sends a validation signal to the central server. Upon receipt of the validation signal, the central server sets the status filed to a fourth value. In response to detection by the Remote Agent that the status field is set to the fourth value, the TCP/IP session between the client and the application server is established. The application server hosts one or more business software applications for the client, and the client accesses the one or more business software applications at the application server using the established TCP/IP session. Files created by the client using the one or more business software applications at the application server are maintained and backed-up periodically at the application server by a service provider on behalf of the client.

In some embodiments, the central server applies address filtering to limit the list of available ports from which the randomly selected ports are chosen. In addition, a SSH tunnel may be used for secure authentication, wherein the server side of the tunnel is implemented with the Remote Agent.

In some embodiments, a firewall is provided for protecting the Remote Agent, and the Master Agent at the central server is used to chain together the request from the client to the Remote Agent to the application server. The port definitions for the firewall are known to the Master Agent and used by the Master Agent to eliminate any need for the Remote Agent to define firewall ports as part of establishing the session.

BRIEF DESCRIPTION OF THE DRAWINGS

FIG. 1 is a diagram illustrating a method for establishing a TCP/IP connection in accordance with the present invention.

DETAILED DESCRIPTION OF THE PREFERRED EMBODIMENT

Referring now to FIG. 1, there is shown a diagram illustrating a method for establishing a TCP/IP connection between a client computer (e.g., a workstation or personal computer) and an application server associated with a Remote Agent, over a computer network such as the internet, in accordance with the present invention. In step 10, the client sends a request to a central server to establish the session. In step 12, and in response to the request, the central server randomly selects two ports at a Master Agent from a predefined port range (e.g., if the port range is 9000-9050, two available ports within this range are randomly selected), and a connection request record having a status field and both port fields is created in a database at the central server. The status field is set to a first value, and the port fields are set to values corresponding to the randomly selected ports. The connection request record has a unique signature known to the Master Agent and Remote Agent. In one embodiment, when the central server randomly selects ports from the port range in step 12, filtering is applied at the central server in a manner that limits the list of available ports in the port range from which the randomly selected ports are chosen.

The Master Agent continuously monitors the database (step 14) for new connection request records having a status field set to the first value. In step 16, upon detection by the Master Agent of the connection request record (i.e., the Master Agent detects a connection request record having a status field set to the first value in the database), the Master Agent opens both randomly selected ports. Next, in step 18, the Master Agent sends an acknowledgement to the central server, that the randomly selected ports are open. In step 20, upon receipt of the acknowledgement at the central server, the central server sets the status field of the connection record to a second value. In response to detection by the client that the status field is set to the second value (step 22), the client retrieves from the central server the value identifying the first randomly selected port. The client then uses the first randomly selected port value in step 24 to establish a TCP/IP connection between the client and the first randomly selected port at the Master Agent. In response to detection by the Remote Agent that the status field is set to the second value (step 26), the Remote Agent retrieves from the central server the value identifying the second randomly selected port. The Remote Agent then uses the second randomly selected port value in step 28 to establish a TCP/IP connection between the Remote Agent and the second randomly selected port at the Master Agent. After both TCP/IP sessions are successfully established, the Master Agent (step 30) sends an acknowledgement to the central server, that the sessions are established, which causes the central server to set the status field to a third value. In response to detection by the client that the status field is set to the third value (step 34), the client sends a validation signal to the central server in step 34; the central server then updates the status field of the connection record to reflect receipt of the validation signal from the client (e.g., the central server updates the value of the status field to a fourth value (different from the first, second and third values) that reflects receipt of the validation signal from the client.)

In step 36, the Remote Agent monitors the status field of the connection request record. In response to detection by the Remote Agent that the status field is set to the fourth value, the Remote Agent establishes a TCP/IP connection with the application server in step 38. The Remote Agent terminates the session in step 38 if the Remote Agent fails to confirm detect that the status field has been set to the fourth value within a predetermined period of time following transmission by the Master Agent to the central server of the acknowledgement that the randomly selected ports were open (i.e., a predetermined time following step 18).

In one embodiment, the present invention is implemented by separate software that resides on each of the central server, the Master Agent, the Remote Agent and the client. Among other functions, the software resident at the central server (the central server software) manages the database connection records (described above) and provides functionality that allows software on the Master Agent (the master agent software), Remote Agent (the remote agent software) and the client (the client software) to extract request records from the central server database. In one embodiment, the master and remote agent software run on the Remote Agent as a Microsoft Windows Services. In addition to performing step 14 (detection of new connection record), step 18 (acknowledgement that both ports are open), and step 30 (acknowledgement that both TCP/IP connections are established), the master agent software includes functionality for defining various configuration values used by the system. In addition to performing step 26 (detection of new connection record), step 28 (establishing TCP/IP connection with Master Agent), step 36 (validation signal monitoring) and step 38 (session termination), the remote agent software includes functionality for defining various configuration values used by the system. The client software includes functionality for performing step 10 (issuing a request to establish a session), step 22 (detection of connection record with status=second value), step 24 (establishing a TCP/IP connection with Master Agent), step 26 (establishing the session with the randomly selected port) and step 34 (sending the validation signal to the central server).

In one embodiment, the present invention is built upon the Microsoft .NET framework, which provides many of the internal interfaces for facilitating the infrastructure of the present invention including: SQL Server for database storage, .NET WEB Services for component communications, ADSI for authentication queries and .NET Cyprtographic Services for encryption.

In one embodiment, the database at the central server stores configuration records for the master and remote agent software that resides on each Master Agent and Remote Agent in the system, and acts as a centralized request queue for functions performed by the system. In this embodiment, all requests to extract information from the database at the central server are made through the central server software, and all calls to the central server and all data passed between the central server and the Master Agent, the Remote Agent or client are encrypted in accordance with the SSL protocol. In one embodiment, where a SSH tunnel is used for secure authentication with the session, the server side of the tunnel is implemented with the Remote Agent.

As mentioned above, the status field of each connection record is used for communicating status information to the Master Agent, the Remote Agent and the client during the process of establishing a session. In one embodiment, the status field of each connection record is set to a value of 101 in step 12 when the central server first creates a new connection record in response to a client request to establish a connection; the status field of the connection record is set to a value of 1 in step 20 following receipt of the acknowledgement from the Master Agent that the randomly selected ports are open; the status field of the connection record is set to a value of 2 in step 30 following receipt of the acknowledgement from the Master Agent that the TCP/IP sessions are established; and the status value of the connection record is set to a value of 3 in response to receipt of a validation signal from the client in step 34. It will be understood by those skilled in the art that other values of the status field may be used for communicating the various stages of the connection request, and such other values are considered to be within the scope of the present invention.

As a result of the inventive sequence for establishing a session described in FIG. 1, the present invention is able to maintain the outside TCP/IP ports of the Master Agent closed until the time that they are required and open no outside TCP/IP ports for the Remote Agent. When a connection is requested, the system then performs the series of validation steps described above to ensure that the connection is opened and managed securely. If the validation steps fail to occur in the proper sequence, or in a specified period of time, the connection is automatically terminated.

In some configurations, a firewall (not shown) is provided for protecting the Remote Agent including, for example, a Remote Agent running as part of a small business network. In these configurations, a Master Agent at the central server may be used to chain together a request from the client to the Remote Agent running in the small business network. The port definitions for the firewall associated with the Remote Agent are known to the Master Agent, and used by the Master Agent to eliminate any need for the Remote Agent to define firewall ports as part of establishing/validating the session.

In a specific implementation of the present invention, the system of FIG. 1 may be used by an employee for accessing a private computer network maintained by his employer (the company). The private computer network includes a first application server at the company's home office and a second application server at one of the company's satellite offices, and the employee desires to use his home computer to access the second application server at the satellite office over the internet. In this example, the central server corresponds to a node on the internet, the Master Agent is associated with the first application server at the company's home office, and the Remote Agent is associated with the second application server at the company's satellite office. In this example, the port definitions for the firewall associated with the second application server (at the satellite office) are known to the first application server (at the home office), and used by the Master Agent to eliminate any need for the Remote Agent to define firewall ports as part of establishing/validating the session.

The inventive sequence for establishing a session described in FIG. 1 can also be used to securely allow users over a network or the Internet to remotely execute and run applications (e.g., Word, Excel, PowerPoint) as on a desktop computer. In one embodiment, this aspect of the invention provides secure internet access from either a pre-configured internet device or from any Web browser, anywhere in the world, to remotely hosted business software applications. A rental/subscription business model may be used for providing this service to users. For example, in exchange for a monthly fee, a service provider (e.g., a telephone company or cable provider) may provide users with all hardware and operating system software required to operate the client computer, as well as access to a base set of business application software which is maintained by the service provider on an application service that is remote from the client computer. In this model, the service provider will be responsible for hardware and maintenance and upgrades at the application server, as well as back-up of client files/data (created using the business application software) maintained at the service provider's application server. A comprehensive suite of application software may be made available on a monthly subscription basis to support the needs of a wide variety of user interests. Internet access fees may be separate or bundled depending on the business model of the service provider.

In one embodiment, a client device (which will be referred to as a Network Computer appliance) is sent by the service provider to the user/consumer pre-configured with all the initial settings and applications initially ordered by the customer/user to allow for simple installation. The Network Computer appliance includes a thin client device which includes a processor, keyboard and mouse along with software for accessing the application server over a network. The Network Computer can be connected to several viewing options such as a consumer television, standard computer monitor, Plasma or LCD display. Each user account may set up in a manner that provides a primary user with the ability to add sub accounts as required. The primary user controls permissions and access to the business application software by the sub account users. For example, a consumer could establish an account for the household which has sub accounts for each of two children and a fourth for a grandparent who lives several states away and does not have the same Internet Service Provider.

Each account and sub account is configured to permit access to the applications software desired by the individual user. So the primary user, a teenager, a toddler, and a grandparent would have access to the different applications they need. Additionally, access to applications software can be turned on and off as required by the primary user. The user sets the permissions for each sub account. A wide variety of user parameters can be modified as required. These include establishing start and end times during which application access is allowed and/or the total time that application access is allowed. A further feature of the Network Computer is "shadowing or desktop sharing." With shadowing, the primary user can actually take full control of the desktop or application of a sub account in real time. Thus a parent at a remote location could actually assist a child working on a school report at the library.

Since, in the rental/subscription business model being described, all of the business software applications reside on the applications servers of the service provider, the service provider handles all applications updates and upgrades centrally, including all operating system maintenance. Thus the consumer is no longer burdened with all the periodic maintenance typically required by a standard personal computer. Automatic data backup, with integrated version control, allows data restoration as it existed previously. The service provider preferably integrates necessary system protections such as spyware control, disk defragmentation, Windows registry maintenance, cookie maintenance, adware, and real-time anti-virus checking. Thus, the consumer is not burdened with these tasks. Thus, users have the same functionality as they would expect on a stand-alone personal computer while totally avoiding the acquisition process, costs, set-up and maintenance for both the hardware and software.

In the rental/subscription business model being described, the consumer is preferably provided an option to select among different available email clients. The service provider manages anti-spam filtering and provides real time anti-virus protection. Because the user account is mobile, records of both incoming and sent messages are viewable from any computer regardless of whether they were sent from the Network Computer or any other workstation. Thus, home email can be monitored and replied to from work home with the resulting sent message always viewable.

The rental/subscription business model is preferably implemented with a technical support module that allows a technician to see the user screen so any required steps can be taken to resolve a service issue. This capability is called shadowing and works on the same concept that allows a user to control the desktop or application of a sub account as discussed above.

Individual application packages offered by the provider are discretionary. Any application available for Windows, LINUX or other operating systems can be made available. The provider may offer individual access for premium applications and develop "packages" of software offerings which would appeal to their individual markets. For example, a business package could include all office productivity applications such as word processors, spreadsheets, or presentation tools.

Using the rental/subscription business model, the concept of applications on demand may be implemented, meaning that the consumer can order a software application and have remote access to the application made immediately available. No waiting for delivery, no installation, no registration, just ready to use. Additionally, an application can be rented for only the time required. For example, a database program could be made available for a limited time to support a work project or a statistical analysis application for several months to support a student working on a thesis.

When accessing via the Network Computer, all data resides on the data servers at the service providers. However, standard file transfer is easily accomplished via the integrated USB (uniform serial bus) port on the Network Computer using either a "thumb" drive or a standard USB hard drive. When accessing the account with a standard personal computer, the internal drives work as normal with the account drive simply showing as any other drive. USB data transfer via other devices such as scanners, digital cameras and printers works normally. In addition, the service provider will preferably determine the amount of data storage they wish to make available to each user account and any price structure to support storage requirements. Finally, printing is easily accomplished via the parallel or USB port on the Network Computer or personal computer. A comprehensive printer driver database is preferably maintained by the service provider to support a wide array of printers and manufacturers.

The rental/subscription business model can be used to provide turn-key application access that is precisely tailored to the specific requirements of each individual user in an organization. For example, a 100 user installation could be operational in the time it takes to plug in and connect the Network Computers to an existing wired or wireless network. In one embodiment, no special client-side software is needed. Unlike other remote access technologies, secure access may be provided by means of a standard Web browser.

The rental/subscription business model may be implemented using a broadband, cable, DSL or dial-up access provider as the service provider. It must be noted however, that a separate hosting company working independent of an Internet access provider could implement this method. This is due to the facts that no specific type of Internet access is required and that the entire system is not captive to any specific provider's access point.

In the rental/subscription business model, the user login process is used to verify that the user is correct and entitled to access. The user is then connected to his personal "desktop" on the provider's applications server and from there forward the communications are direct point to point. Significantly, all processing is performed on the provider's equipment thus dramatically reducing the volume of data that needs to be transmitted between the server and the user. Essentially, only the Windows screen is sent to the user and none of the application or data. Thus, a standard 56K dial-up connection can offer the apparent speed of a high speed broadband connection.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method for establishing a TCP/IP connection between a client computer and an application server computer associated with a Remote Agent, and the method being deployed over an intermediate central server computer having a database therein, comprising:
   (a) sending a request to establish a session from the client computer to a central server computer;
   (b) in response to the request at the central server, randomly selecting at least first and second ports at a Master Agent from a list of available ports, creating a connection request record having a status field and port fields in said database at the central server, setting the status field to a first value, and setting the port fields to values corresponding to the randomly selected ports, wherein the connection request record has a unique signature known to the Master Agent and Remote Agent;
   (c) monitoring the database for new connection request records having a status field set to the first value, wherein the monitoring is performed by the Master Agent;
   (d) upon detection of the connection request record created in step (b), opening the randomly selected ports, and sending, from the Master Agent to the central server, an acknowledgement that the randomly selected ports are open;
   (e) upon receipt of the acknowledgement at the central server, setting the status field to a second value;
   (f) in response to detection by the client computer that the status field is set to the second value, establishing by the client computer a first TCP/IP connection between the client computer and the first randomly selected port;
   (g) in response to detection by the Remote Agent that the status field is set to the second value, establishing by the Remote Agent a second TCP/IP connection between the Remote Agent and the second randomly selected port;
   (h) in response to detection by the Master Agent that the first and second TCP/IP connections are established, sending an acknowledgement to the central server;
   (i) upon receipt of the acknowledgement at the central server, setting the status field to a third value;
   (j) in response to detection by the client computer that the status field is set to the third value, sending a validation signal to the central server;
   (k) upon receipt of the validation signal at the central server, setting the status field to a fourth value;
   (l) in response to detection by the Remote Agent that the status field is set to the fourth value, establishing the TCP/IP session between the client computer and the application server;
      wherein the application server hosts one or more business software applications for the client computer, the client accesses the one or more business software applications at the application server computer using the TCP/IP session established in step (k) and wherein a SSH tunnel is used for secure authentication, and the server side of the tunnel is implemented with the Remote Agent.

2. The method of claim 1, wherein the application server computer provides one or more of operating system software and updates as needed to operate the client computer and business application software to the client computer.

3. The method of claim 1, wherein a display for the client computer is implemented on a television, plasma or LCD screen.

4. The method of claim 1, wherein the application server computer grants access to the client computer for one or more business software applications in exchange for a periodic subscription fee.

5. The method of claim 1, wherein the application server computer assigns a primary account to a main user, and the main user has the ability to add and manage sub-user accounts;
  wherein the main user selectively grants access to the one or more business software applications to the sub-users.

6. The method of claim 1, wherein the central server applies address filtering to limit the list of available ports from which the randomly selected ports are chosen.

7. The method of claim 1, wherein a firewall is provided for protecting the Remote Agent, and the Master Agent is used to chain together the request from the client to the Remote Agent;
  wherein port definitions for the firewall are known to the Master Agent and used by the Master Agent to eliminate any need for the Remote Agent to define firewall ports as part of establishing the session.

8. A networked computer system for establishing a TCP/IP connection between a client computer and an application server computer associated with a Remote Agent on an intermediate central server computer communicatively networked with the client computer, comprising:
  (a) a client software module that sends a request to establish a session from the client computer to said central server computer;
  (b) the central server that, in response to the request, randomly selects at least first and second ports at a Master Agent from a list of available ports, creates a connection request record having a status field and two port fields in a database coupled to the central server, sets the status field to a first value, and sets the port fields to values corresponding to the randomly selected ports;
  (c) the Master Agent monitors the database for new connection request records having a status field set to the first value, wherein the connection request record has a unique signature known to the Master Agent; and
    upon detection of the connection request record, the Master Agent opens the randomly selected ports and sends to the central server an acknowledgement that the randomly selected ports are open;
    upon receipt of the acknowledgement at the central server, the central server sets the status field to a second value; and
    in response to detection by the client that the status field is set to the second value, the client establishes a first TCP/IP connection between the client computer and the first randomly selected port;
    in response to detection by the Remote Agent that the status field is set to the second value, the Remote Agent establishes a second TCP/IP connection between the client computer and the second randomly selected port;
    in response to detection by the Master Agent that the first and second TCP/IP connections are established, the Master Agent sends an acknowledgement to the central server;
    upon receipt of the acknowledgement at the central server, the central server sets the status field to a third value; and
    in response to detection by the client computer that the status field is set to the third value, the client computer sends a validation signal to the central server;
    upon receipt of the validation signal at the central server, the central server sets the status field to a fourth value; and
    in response to detection by the Remote Agent that the status filed is set to the fourth value, the TCP/IP session between the client computer and the application server computer is established;
    a SSH tunnel is used for secure authentication, and the server side of the tunnel is implemented with the Remote Agent; and
    the application server hosts one or more business software applications for the client, the client accesses the one or more business software applications at the application server using the established TCP/IP session.

9. The system of claim 8, wherein the application server computer provides one or more of operating system software and updates as needed to operate the client computer and business application software to the client computer.

10. The system of claim 8, wherein a display for the client computer is implemented on a television, plasma or LCD screen.

11. The system of claim 8, wherein the application server computer grants access to the client computer for one or more business software applications in exchange for a periodic subscription fee.

12. The system of claim 8, wherein the application server computer assigns a primary account to a main user, and the main user has the ability to add and manage sub-user accounts;
  wherein the main user selectively grants access to the one or more business software applications to the sub-users.

13. The system of claim 8, wherein the central server applies address filtering to limit the list of available ports from which the randomly selected ports are chosen.

14. The system of claim 8, wherein a firewall is provided for protecting the Remote Agent, and the Master Agent is used to chain together the request from the client to the Remote Agent; wherein port definitions for the firewall are known to the Master Agent and used by the Master Agent to eliminate any need for the Remote Agent to define firewall ports as part of establishing the session.

* * * * *